United States Patent
Gomez Diaz et al.

[11] Patent Number: 6,102,161
[45] Date of Patent: Aug. 15, 2000

[54] DISPENSING DEVICE FOR LUBRICANT COMPOSITION

[75] Inventors: Jesus Gomez Diaz; Jose Mendez, both of Buenos Aires, Argentina

[73] Assignee: Diversey Lever, Inc., Plymouth, Mich.

[21] Appl. No.: 09/327,090

[22] Filed: Jun. 4, 1999

[30] Foreign Application Priority Data

Jul. 2, 1998 [AR] Argentina ................ M980103216

[51] Int. Cl.⁷ .................................... F16N 13/22

[52] U.S. Cl. ............................................. 184/15.3

[58] Field of Search .................. 184/15.1, 15.3

[56] References Cited

U.S. PATENT DOCUMENTS 5,360,084  11/1994  Graf.

FOREIGN PATENT DOCUMENTS 0 599 087 A1  of 0000  European Pat. Off..
0 832 805 A2  of 0000  European Pat. Off..

*Primary Examiner*—Dirk Wright

[57] ABSTRACT

A lubricant composition dispensing device comprising a hollow body (1) which houses a collecting pipe (2) is described. The collecting pipe has perforations (2b) that allows for lubricant composition to extend to a high density felt cloth (5) which contacts and delivers the lubricant composition to conveyor belts.

10 Claims, 2 Drawing Sheets

DISPENSING DEVICE FOR LUBRICANT COMPOSITION

FIELD OF THE INVENTION

This invention relates to a dispensing device for lubricant compositions. More particularly, the invention is directed to a dispensing device that distributes a lubricant composition to the belts of conveyors used in a variety of industries, including the bottling industries.

BACKGROUND OF THE INVENTION

At bottling plants, for example, bottles are conveyed by means of a conveyor which typically comprises conveyor belts made of stainless steel, iron or plastic chains having side railings which hold the bottles on the conveyor. Conventional bottling lines consist of a large quantity of these types of chains which make up the belts of the conveyors.

The surface of the chains must be lubricated for bottles being transported on the conveyor to remain in position. Such lubrication, therefore, prevents the bottles from falling off the conveyor when, for instance, a machine failure or temporary halt of the conveyor causes the bottles to stop. This is true because lubrication allows for the chains of the conveyor belt to proceed in motion (in a friction-free manner) without causing the motionless bottles to fall.

In the absence of appropriate lubrication, however, the chains of the conveyor belts can break or be cut, causing bottles to fall, loose their contents and/or break. Moreover, due to stress, motor reducers of the conveyors would break down or burn out their coils. Thus, improperly lubricated conveyors can cause in a production standstill, resulting in important economic losses in the bottling industry.

Conventional processes for lubricating bottling lines are generally performed as follows:

The equipment, with lubricant composition supply, delivers the lubricant through pipes attached to a lateral of the conveyor. From the pipes, the composition is delivered to collectors, which consist of a ¾ bar and injection holders. The injectors have holes of sizes that vary from 0.30 to 0.50 mm, wherein one injector is located at the center of each conveyor belt allowing for the homogeneous distribution of lubricant composition throughout the conveyor.

Such conventional processes, however, exhibit several problems and disadvantages. This is true because injection holes often are easily clogged. Further, much of the lubricant composition, like 70%, falls to the floor before being distributed by the bottles on the conveyors. Thus, only 30% of the lubricant composition is used, with the remainder being wasted and creating environmentally unfriendly conditions. Still further, conventional processes contain jets that spray a mist of the lubricant composition that often contaminates the product being bottled.

It is of increasing interest to produce a dispensing device to apply or dispense a lubricant composition, in the absence of the above-described problems. The present invention, therefore, is directed to a lubricant composition dispensing device that comprises a hollow body, which houses in the interior thereof a collecting pipe exhibiting a plurality of transverse perforations, and an absorbing felt cloth preferably consisting of high density felt, which partially protrudes from said hollow body through a bottom opening thereof.

SUMMARY OF THE INVENTION

The present invention is based on a new dispensing device which does not function through hole plates. The dispensing device consists of a hollow body made of stainless steel, plastic or other material, having dimensions that vary according to the chains supplying each particular conveyor.

The hollow body houses an absorbing cloth, in such a way that one of the ends of the absorbing cloth protrudes from the bottom of the hollow body. The dispenser of this invention is installed at each of the heads of the conveyors. The dispenser is attached to the conveyers by means of stainless clamps in such a way that the cloth protrudes from the hollow body and rests on the chains of the conveyor.

The dispenser is fed, similarly to dispensers known in the art, by pipes which are attached to the sides of the conveyor. Lubricant composition will be supplied so as to feed the dispenser's hollow body, and the composition will be absorbed by the cloth, which in turn will transfer the lubricant composition to the conveyor chains by contact.

This novel lubricant composition dispensing device exhibits the following advantages when compared to known systems.

The dispensing device of the present invention is not clogged by the composition being dispersed, resulting in savings in terms of workmanship. Furthermore, 100% of the lubricant composition is used due to the fact that the chain itself carries the composition thereby preventing splashing of the composition onto the floor. Moreover, the dispensing device of the present invention allows for dosing of the composition in a manner that is homogeneous throughout all of the conveyor chains being lubricated. Thus, the superior dispensing device of this invention results in the application of lubricant composition onto conveyor chains at high concentrations and with low consumption. Also, the device of this invention allows for low water consumption, and since lubrication with the device of this invention is more concentrated, the need for overflows is eliminated.

DETAILED DESCRIPTION OF THE PREFERRED EMBODIMENTS

Figure 1:
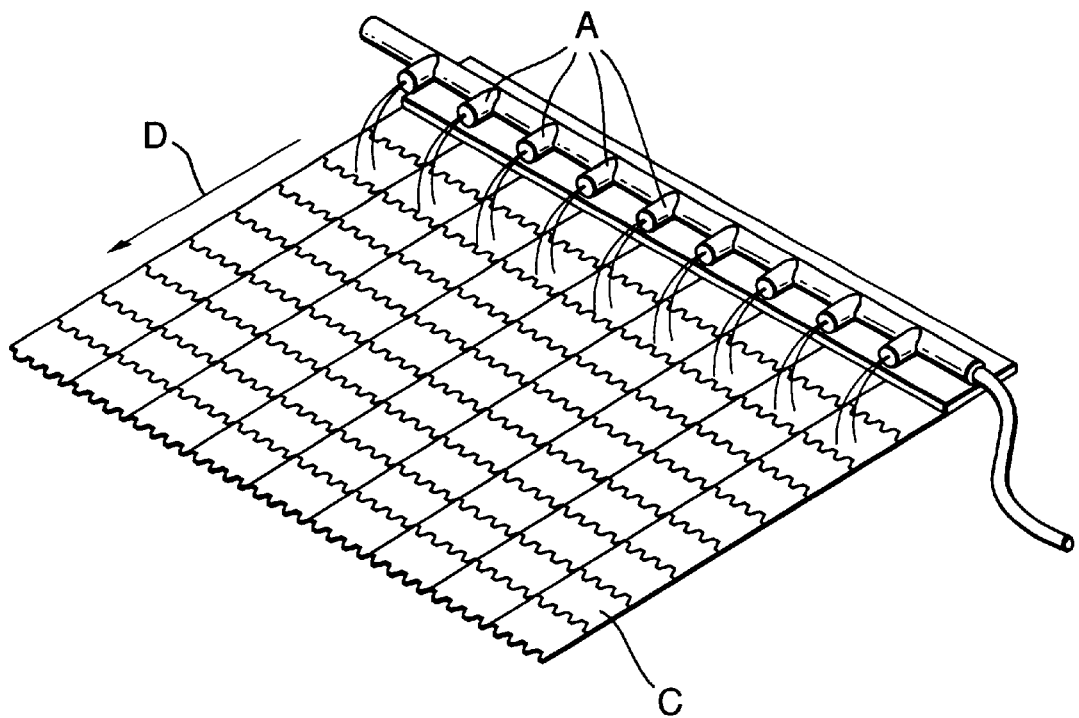
FIG. 1 schematically shows a conventional lubricant dispensing system.

FIG. 1 shows a conventional system of lubrication by means of injectors A which spray lubricant to chain C.

Figure 2:
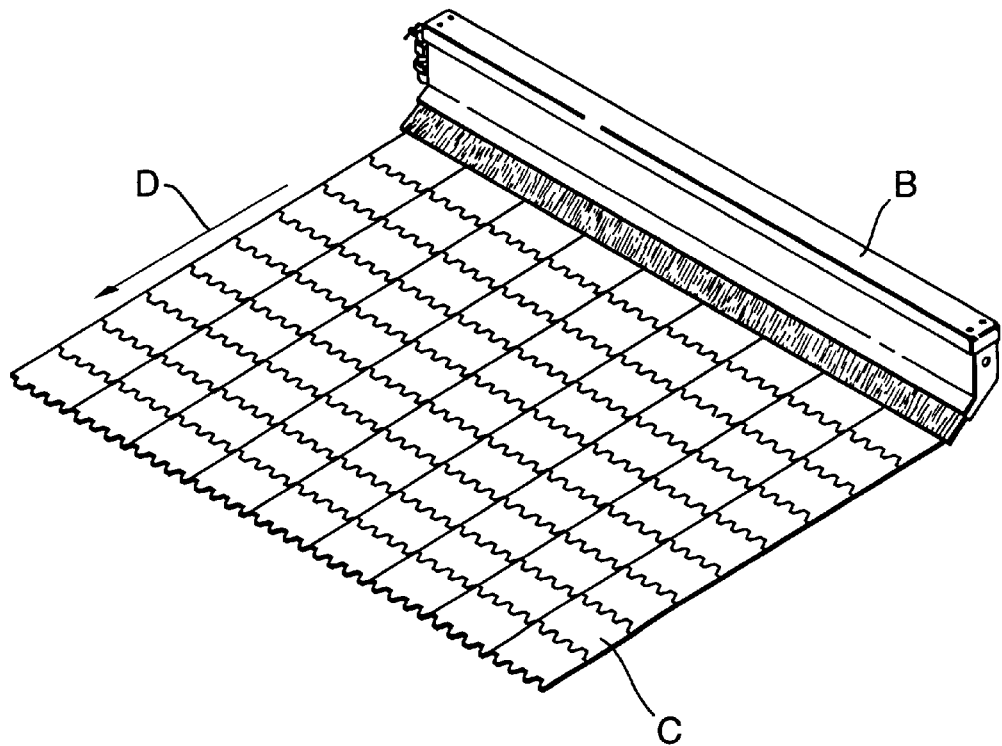
FIG. 2 schematically shows the dispensing device according to the invention, arranged on a conveyor chain.

FIG. 2 shows dispensing device B according to the invention, arranged over chain C, in its operating position.

Figure 3:
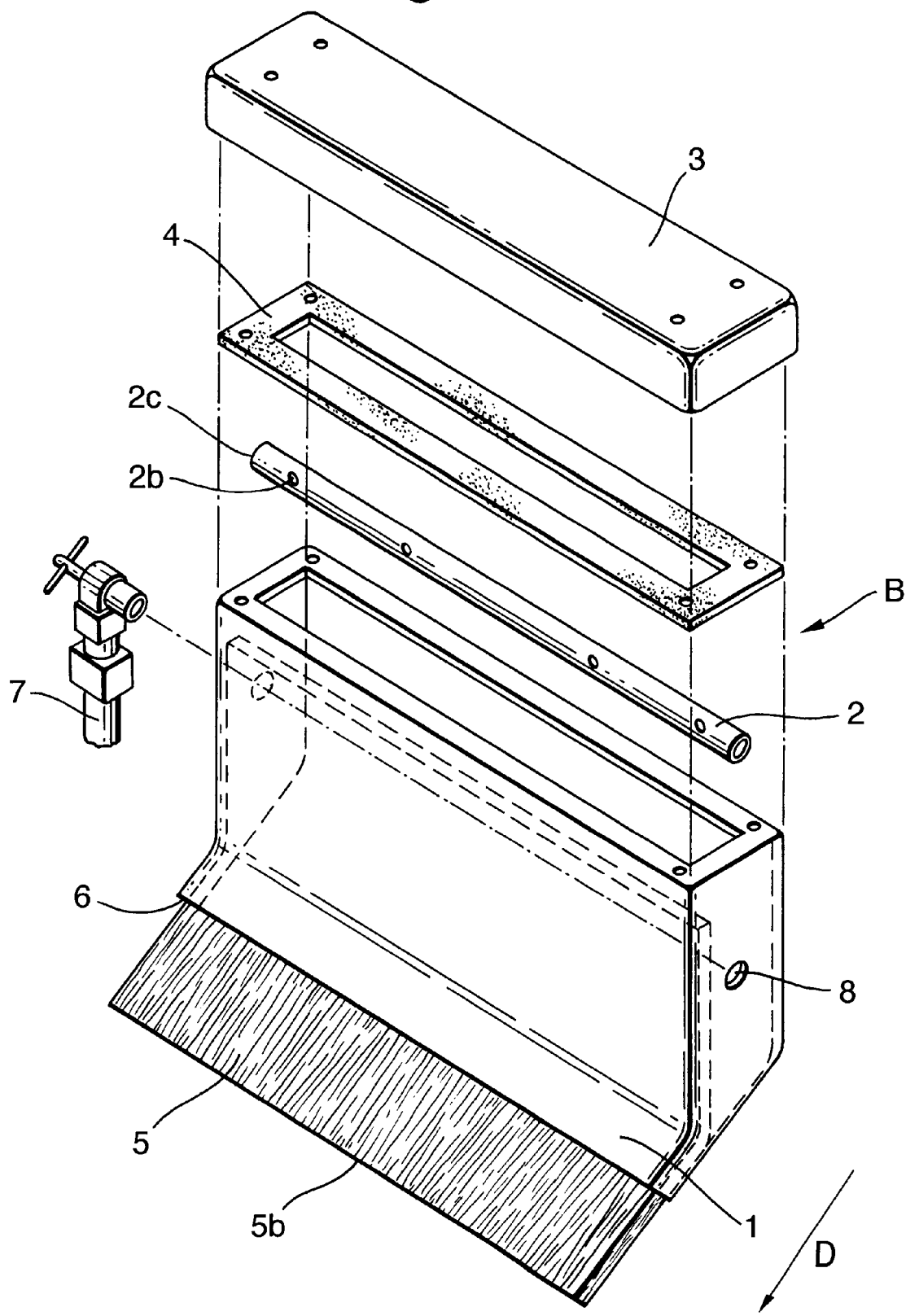
FIG. 3 shows an exploded view of the dispensing device according to the invention.

FIG. 3 is an exploded view of dispensing device B, where it can be observed that the dispensing device B is formed by a hollow body 1 which houses in the inside thereof a collecting pipe 2 which exhibits transverse perforations 2b and internal end threads 2c, a cover 3 of said body 1, a seal 4, an absorbing cloth 5 consisting of a high density felt, the major part thereof being inside hollow body 1, and protruding therefrom through an opening 6, forming a supporting overlap over chain C. There is also shown an injection valve 7, which is external to the hollow body 1 and connected to end threads 2c for the introduction of lubricant into collecting pipe 2.

Obviously, the length of body 1 may vary according to conveyor specifications, and should it be necessary, more than one body 1 may be joined by outlet hole 8 of collecting pipe 2.

When assembled at its place of operation, liquid lubricant composition is injected through valve 7 into collector pipe 2. The composition passes through perforations 2b made on said collecting pipe and fills hollow body 1. Subsequently, the liquid lubricant composition soaks felt cloth 5 and proceeds towards the external free end portion 5b of said cloth 5.

The external portion 5b of cloth 5 rests on chain C and as the absorbing cloth 5 is displaced in the direction of arrow D, the free end portion 5b of the cloth 5 delivers lubricant composition onto the chain C in a quantity necessary for the appropriate lubrication thereof.

What is claimed is:

1. A lubricant composition dispensing device (B), comprising a hollow body (1) which houses in the interior thereof a collecting pipe (2) having a plurality of transverse perforations (2b), and an absorbing felt cloth (5), which partially protrudes from said hollow body through a bottom opening thereof (6).

2. The lubricant composition dispensing device according to claim 1, further comprising a cover (3) and a seal (4) wherein the cover is mounted to a top portion of the hollow body (1) and the seal is positioned between the top portion and the cover.

3. The lubricant composition dispensing device according to claim 1, further comprising a lubricant composition injection valve (7), the lubricant composition injection valve mounted external to the hollow body (1) and connected to the collecting pipe (2).

4. The lubricant composition dispensing device according to claim 1, wherein the lubricant composition dispensing device is mounted to a conveyor.

5. The lubricant composition dispensing device according to claim 4, wherein the conveyor comprises a chain (C).

6. The lubricant composition dispensing device according to claim 5, wherein the chain is lubricated by the lubricant composition discharged by the lubricant composition dispensing device.

7. The lubricant composition dispensing device according to claim 4 wherein the conveyor is used in the bottling industry.

8. The lubricant composition dispensing device according to claim 4, wherein the lubricant composition dispensing device does not comprise injectors (A) that spray lubricant composition onto the chain.

9. The lubricant composition dispensing device according to claim 4 wherein the absorbing cloth (5) consisting of high density felt has an external portion (5b) that contacts the chain.

10. The lubricant composition dispensing device according to claim 9, wherein the external portion (5b) delivers lubricant composition to the chain by contact.

* * * * *